United States Patent
Cohen et al.

(10) Patent No.: US 10,719,557 B2
(45) Date of Patent: Jul. 21, 2020

(54) CONCURRENT AUTOMATIC ADAPTIVE STORAGE OF DATASETS IN GRAPH DATABASES

(71) Applicant: PALANTIR TECHNOLOGIES INC., Palo Alto, CA (US)

(72) Inventors: David Cohen, Los Altos, CA (US); Landon Carter, Cary, NC (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 265 days.

(21) Appl. No.: 15/872,232

(22) Filed: Jan. 16, 2018

(65) Prior Publication Data

US 2019/0220546 A1    Jul. 18, 2019

(51) Int. Cl.
| | |
|---|---|
| *G06F 15/16* | (2006.01) |
| *G06F 16/901* | (2019.01) |
| *G06F 16/25* | (2019.01) |
| *G06F 16/9038* | (2019.01) |
| *G06F 16/903* | (2019.01) |
| *G06F 21/60* | (2013.01) |
| *G06F 16/2452* | (2019.01) |

(52) U.S. Cl.
CPC ...... *G06F 16/9024* (2019.01); *G06F 16/2452* (2019.01); *G06F 16/254* (2019.01); *G06F 16/258* (2019.01); *G06F 16/9038* (2019.01); *G06F 16/90335* (2019.01); *G06F 21/604* (2013.01)

(58) Field of Classification Search
None
See application file for complete search history.

(56) References Cited

U.S. PATENT DOCUMENTS

| | | | |
|---|---|---|---|
| 6,266,660 B1 | 7/2001 | Liu et al. | |
| 9,348,880 B1 * | 5/2016 | Kramer | G06F 16/27 |

(Continued)

OTHER PUBLICATIONS

Ou A BaseBD Quality Architecture at Scale for Big Data, "Neo4j Darta Model Features", dated Jan. 27, 2015, 3 pages.

*Primary Examiner* — Alex Gofman
(74) *Attorney, Agent, or Firm* — Hickman Palermo Becker Bingham LLP

(57) ABSTRACT

Techniques for improving database searches are described herein. In an embodiment, a computer-implemented data processing method comprises receiving a request to store a digital data object in a non-graph data repository, the data object comprising one or more first properties, the data object conforming to a first schema of the non-graph data repository; in response to the initiating, concurrently: digitally storing the data object in the non-graph data repository; transforming the data object into one or more nodes and edges of a graph; storing the one or more nodes and edges of the graph in a graph data repository that is separate from the non-graph data repository; electronically receiving a search query that specifies a path-based search; in response to receiving the search query: transforming the search query into a graph search query; submitting the graph search query to the graph data repository; receiving a result set of nodes from the graph data repository; transforming the result set of nodes into a set of corresponding data objects in the non-graph data repository; providing the set of corresponding data objects as output in a computer display.

18 Claims, 7 Drawing Sheets

(56) References Cited

U.S. PATENT DOCUMENTS

| | | | |
|---|---|---|---|
| 2004/0117351 A1 | 6/2004 | Challapalli et al. | |
| 2006/0015490 A1 | 1/2006 | Denuit et al. | |
| 2013/0018900 A1* | 1/2013 | Cheng | G06F 7/00 |
| | | | 707/755 |
| 2015/0302113 A1* | 10/2015 | Rosenberg | G06F 16/211 |
| | | | 707/722 |
| 2015/0309719 A1* | 10/2015 | Ma | G06F 16/904 |
| | | | 715/771 |
| 2016/0203327 A1* | 7/2016 | Akkiraju | G06F 16/9024 |
| | | | 707/785 |
| 2018/0144062 A1* | 5/2018 | Jan | G06F 16/25 |

\* cited by examiner

CONCURRENT AUTOMATIC ADAPTIVE STORAGE OF DATASETS IN GRAPH DATABASES

FIELD OF THE DISCLOSURE

The present disclosure is in the technical field of computer-implemented electronic digital distributed data storage systems that use multiple data repositories and indexes. Another technical field is computer-implemented queries, searches and search results for data stored in a database. Still another technical field is graph database systems in which digitally stored data is organized in graphs comprising nodes and edges.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database systems such as relational databases and object databases typically implement an index to facilitate efficient and rapid search and retrieval of records from the database. However, the metadata managed in different database systems, and different kinds of indexing methods, may have different strengths and weaknesses. There may be certain queries that are time-consuming or inefficient when submitted to a traditional database index. Examples include queries to specify a path of connections between endpoint entities. Performing a path-based search may require submitting a first query to the database, receiving a result set of data objects with properties and links, performing many more queries to retrieve other data objects by following the links, and repeating the process iteratively until all links have been followed; this approach requires many cross-network message roundtrips and cannot scale to large numbers of queries against databases that have large numbers of objects with complex relationships to other objects.

Certain graph database systems are optimized to organize metadata and conduct searches using logical graphs consisting of nodes and edges, with graph traversal algorithms that can be superior in some cases to traditional relational database indexes. Unfortunately, the data object schema implemented by a graph database typically is considerably different than the schema or ontology of a non-graph database system.

Analytics applications generally access large datasets to perform analytic operations. When a user wishes to perform an operation on a dataset, the user identifies where the dataset is stored and the analytics application sends a query to the server storing the dataset. The server computer system storing the dataset executes the query against the dataset and returns the requested information to the analytics application. Depending on the type of query, executing the query against the dataset can be extremely inefficient. Path-based queries are an example. If the result set for a query comprises data items with paths representing relationships among the data items, executing the query directly against a relational or columnar database requires the server computer system to check each row to determine if the row satisfies the query. Indexes of the relational or columnar database typically cannot be used as a source of relationship information between one record and another.

Therefore, relational and columnar databases typically require unacceptable amounts of time to produce result sets for path-oriented searches in large or complex datasets.

Consequently, there is a need in the technical field of distributed databases for new, efficient approaches for retrieving results for path-oriented searches when large-scale data repositories are involved.

SUMMARY

The appended claims may serve to summarize the disclosure.

DETAILED DESCRIPTION

Figure 1:
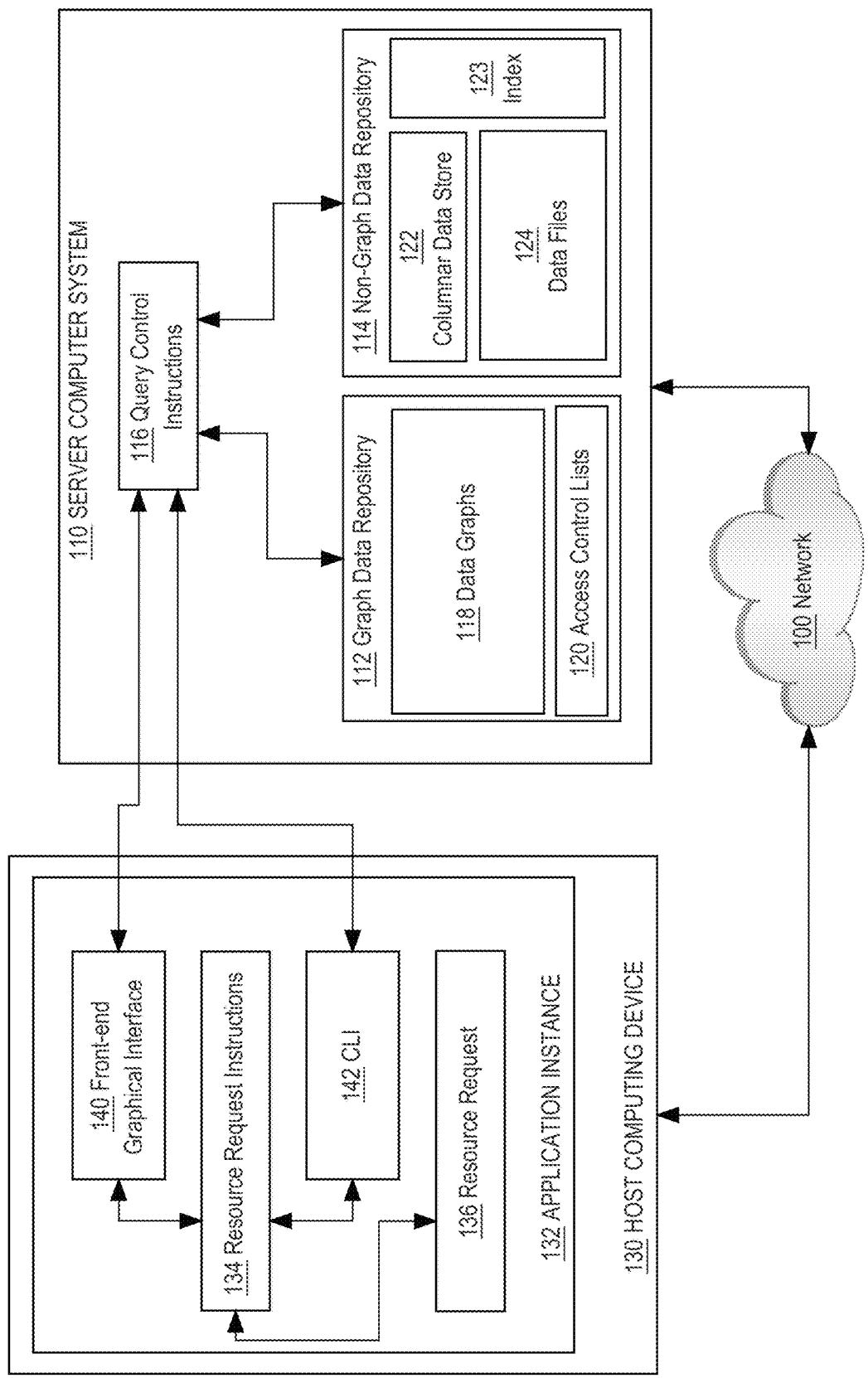
FIG. 1 illustrates a schematic diagram of a distributed computing system that includes both a non-graph data repository and a graph data repository.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
General Overview
Example Computer System Overview
Example Process Overview
Implementation Example—Hardware Overview
Implementation Example—Basic Software System
Extensions and Alternatives

General Overview

Techniques for improving database searches are described herein. In an embodiment, a computer-implemented data processing method comprises receiving a request to store a digital data object in a non-graph data repository, the data object comprising one or more first properties, the data object conforming to a first schema of the non-graph data repository; in response to the initiating, concurrently: digitally storing the data object in the non-graph data repository;

transforming the data object into one or more nodes and edges of a graph; storing the one or more nodes and edges of the graph in a graph data repository that is separate from the non-graph data repository; electronically receiving a search query that specifies a path-based search; in response to receiving the search query: transforming the search query into a graph search query; submitting the graph search query to the graph data repository; receiving a result set of nodes from the graph data repository; transforming the result set of nodes into a set of corresponding data objects in the non-graph data repository; providing the set of corresponding data objects as output in a computer display.

In an embodiment, a non-graph database system is programmed to concurrently store a copy of data object metadata in a graph database, in response to execution of a store operation in the non-graph database system. Thus, in the non-graph database system, a storage operation results in storing object metadata both in the native index of the non-graph database system, and in a separate graph database system, which effectively serves as a secondary index for the non-graph database. The solution includes automatically mapping and copying data object properties from an ontology or schema of the non-graph database system to an otherwise incompatible ontology or schema of the graph database system.

Furthermore, in the non-graph database system, a search query may be received. In response, the system causes performing concurrent searches both in the native index of the non-graph database system, and in the graph database system, which effectively operate as federated primary and secondary indices. For queries that seek a path of connections between endpoint entities, a graph database search produces far faster results. The solution includes automatically transforming the original search query into one that is compatible with a graph database search. A result set from the graph database system is mapped automatically back to a set of objects in the non-graph database system, enabling accurate display of the original data. Sub concepts include implementing security features such as realms and access controls within the graph database.

Example Computer System Overview

FIG. 1 illustrates a schematic diagram of a distributed computing system that includes both a non-graph data repository and a graph data repository.

In an embodiment, a distributed computing system comprises a server computer ("server") 110 coupled via a data communications network 100 to a host computing device 130. The distributed computing environment can be within one or more data centers, virtual computing facilities or other hosting facilities connected to the network 100; other embodiments can be within a networked home, office, or campus.

Network 100 broadly represents a combination of one or more local area networks, wide area networks, and/or internetworks and may include the public internet. Any of wired, wireless, terrestrial or satellite links may be used in the network 100. The network 100 can connect multiple hosts 130 together within the distributed computing environment. Network 100 can be composed of multiple sub-networks that are connected. For example, the network 100 can be an Internet Protocol Version 4-based and/or an Internet Protocol Version 6-based wired or wireless network or a combination of multiple such networks.

Host computing device 130 ("host") broadly represents one or many computers and the number of hosts 130 in the system at a given time may vary in different embodiments and any number may be used. In an embodiment, a host 130 can be a single computing device such as, for example, the computing device 400 described below with respect to FIG. 4. Alternatively, a host 130 can be a single virtual computer instance that executes on a computing device facilitated by a virtualization layer interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system such as, for example, operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g. the DOCKER container system or KUBERNETES container system) for running services or microservices within containers on the host's operating system. Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. An example of an application instance 132 is a data analysis application that facilitates importing data about entities, creating data entities and relationships among them, creating associations of entities, media and metadata as named investigations that are subject to access controls or security services, creating search queries and submitting the search queries to the server 110, displaying result sets, reorganizing and redisplaying search results, and other functions. In an embodiment, application instance 132 comprises resource request instructions 134, a front-end graphical interface 140 and a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also manages one or more resource requests 136 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises a graph data repository 112, non-graph data repository 114, and query control instructions 116. In an embodiment, the graph data repository 112 comprises data graphs 118 and access control lists 120.

The graph data repository 112 may be a database that uses graph structures for semantic queries with nodes, edges and properties to represent and store data; a graph or edge or relationship relates data items in the store. The relationships allow data in the store to be linked together directly, and in many cases retrieved with one operation. This contrasts with relational databases that, with the aid of relational database management systems, permit managing the data in its natural structure without imposing implementation aspects like physical record chains, where, among multiple other aspects, links between data are stored in the data itself at the logical level, and use the multiple relational algebra operations (e.g., join) to manipulate and return related data in the relevant logical format. Graph databases, by design, allow simple and fast retrieval of complex hierarchical structures that are difficult to model in relational systems.

The underlying storage mechanism of graph databases can vary. Some depend on a relational engine and store the graph data in a table; others use a key-value store or document-oriented database for storage. Some graph databases based on non-relational storage engines also add the concept of tags or properties, which are essentially relationships having a pointer to another document. This allows data elements to be categorized for rapid mass retrieval. Retrieving data from a graph database often uses a query language other than SQL, which was designed for the manipulation of data in a relational system and therefore cannot "elegantly" handle traversing a graph. In addition to having query language interfaces, some graph databases are accessed through application programming interfaces (APIs).

Examples of available graph databases that could be used, in various embodiments, as graph data repository 112 include ARANGODB, CAYLEY, DGRAPH, GSTORE, JANUSGRAPH, NEO4J, OPENLINK VIRTUOSO and ORIENTDB. These databases have been optimized for finding connections among data that is related in a graph.

In an embodiment, non-graph data repository 114 comprises a columnar data store 122 and data files 124. Typically the non-graph data repository 114 stores data based upon an object model or ontology in which data objects represent entities and data objects have properties or attributes that can be described or defined in a hierarchical ontology or schema. This data may be indexed in one or more indexes 123; in some embodiments the non-graph data repository 114 supports a native index 123 and also has connections to secondary indexes. Secondary indexes may be based upon ELASTICSEARCH, for example, which is commercially available from Elastic at elastic.co on the internet, and can support a federated search system in which queries are concurrently submitted to a plurality of indexes for performance purposes or to obtain results in different formats. In an embodiment non-graph data repository 114 comprises a distributed data storage system which stores one or more resources. The resources may comprise one or more of individual documents, folders, JSON blobs, rows in a database, user comments or flags, media files, build artifacts, and/or any other digital resource. In some embodiments, non-graph data repository 114 is a relational database. The particular type of database, data repository or data storage system that is used to implement non-graph data repository 114 is not critical, provided that it is not a graph database of the type previously described for graph data repository 112.

Access control lists 120 comprise one or more access control policies to be applied to graph data repository 112. For example, access control lists 120 may implement row-level access controls on data in a database. Access control lists may identify access controls for individual user identifications, role identifications, and/or user group identifications.

In an embodiment, query control instructions 116 comprises a set of one or more pages of main memory, such as RAM, in the server 110 into which executable instructions have been loaded and which when executed cause the server to perform the functions or operations that are described herein with reference to those modules. For example, the query control instructions 116 may comprise a set of pages in RAM that contain instructions which when executed cause performing the query analysis functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, query control instructions 116 also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. In other words, the drawing figure may represent the manner in which programmers or software developers organize and arrange source code for later compilation into an executable, or interpretation into bytecode or the equivalent, for execution by the server 110.

In an embodiment, query control instructions 116, when executed by one or more processors, are programmed or configured to cause server computer system 110 to receive a request to store a dataset, and in response, to cause storing the dataset using both the graph data repository 112 and the non-graph data repository 114. In an embodiment, the storing operations include signaling the graph data repository 112 to store the dataset partially, such as by storing only metadata relating to the dataset, and signaling the non-graph data repository 114 to store the datasets in full, such as by including data source records. With this arrangement, the graph data repository 112 builds the data graphs 118 each comprising nodes and edges representing relationships of nodes. Further, in parallel, records or rows are stored in the non-graph data repository 114 including data source records with columnar data of any complexity. The result is a federated data search system in which graph data repository 112 is optimized to perform path-based searches by traversing the data graphs, and non-graph data repository 114 functions as a system of record that can supply data source records, and/or respond to queries that do not require path-based searching.

The query control instructions 116 also are programmed or configured to cause the server 110 to receive electronic digital messages that specify data repository operations according to a query language, parse the messages to determine the operations, submit the query to both the graph data repository 112 and the non-graph data repository 114, to execute the operations against the datastores, receive result sets from one or both of the graph data repository and the non-graph data repository and provide one or more of the result sets to a calling application or process, such as application instance 132 of host 130. Processing queries in this manner also comprises mapping a result set from the graph data repository 112 to data records in the non-graph repository. Therefore, the graph data repository 112 may return a result set that is capable of visual graphical display as a set of nodes and edges, and corresponding data source records may be retrieved near in time from the non-graph data repository 114 so that column values or other data attributes not captured in the data graphs 118 can be displayed.

Example Process Overview

Figure 2:
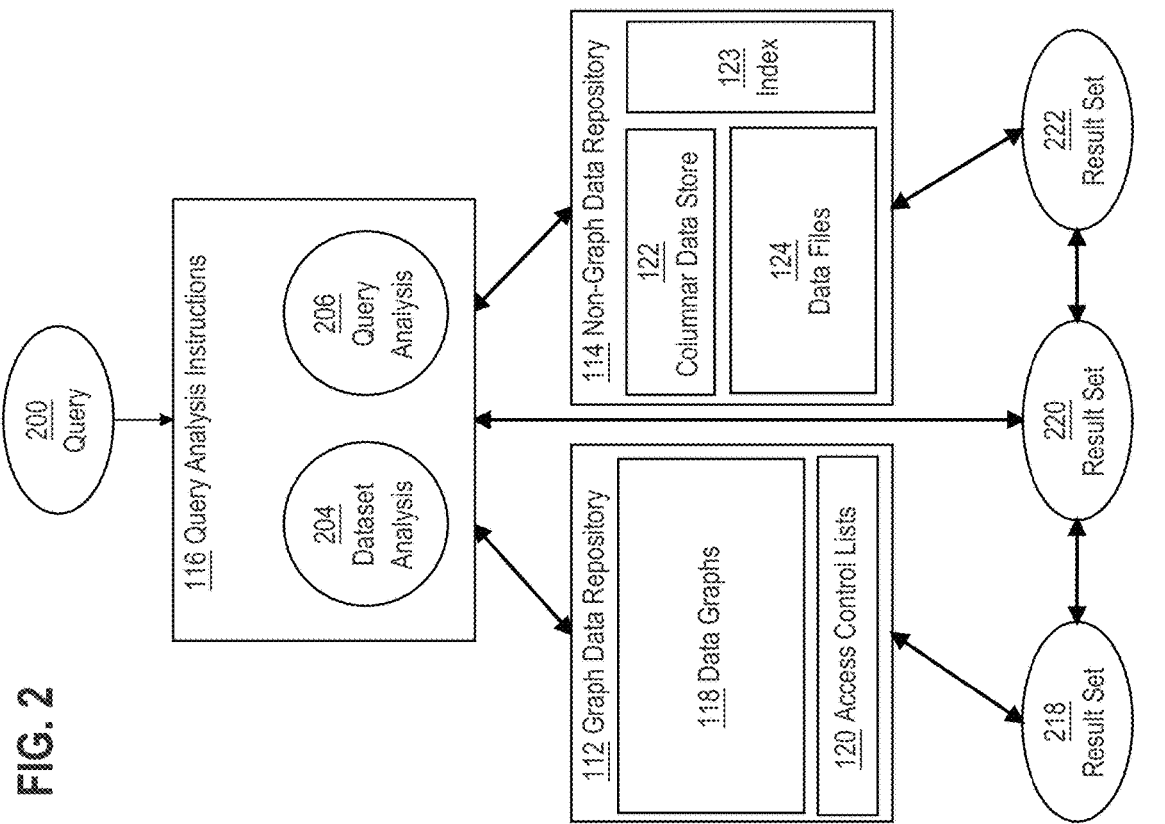
FIG. 2 illustrates an example method or algorithm that may be programmed for storing data in a graph data repository as a secondary index for a non-graph repository and for processing queries against both data repositories.
Figure 2:
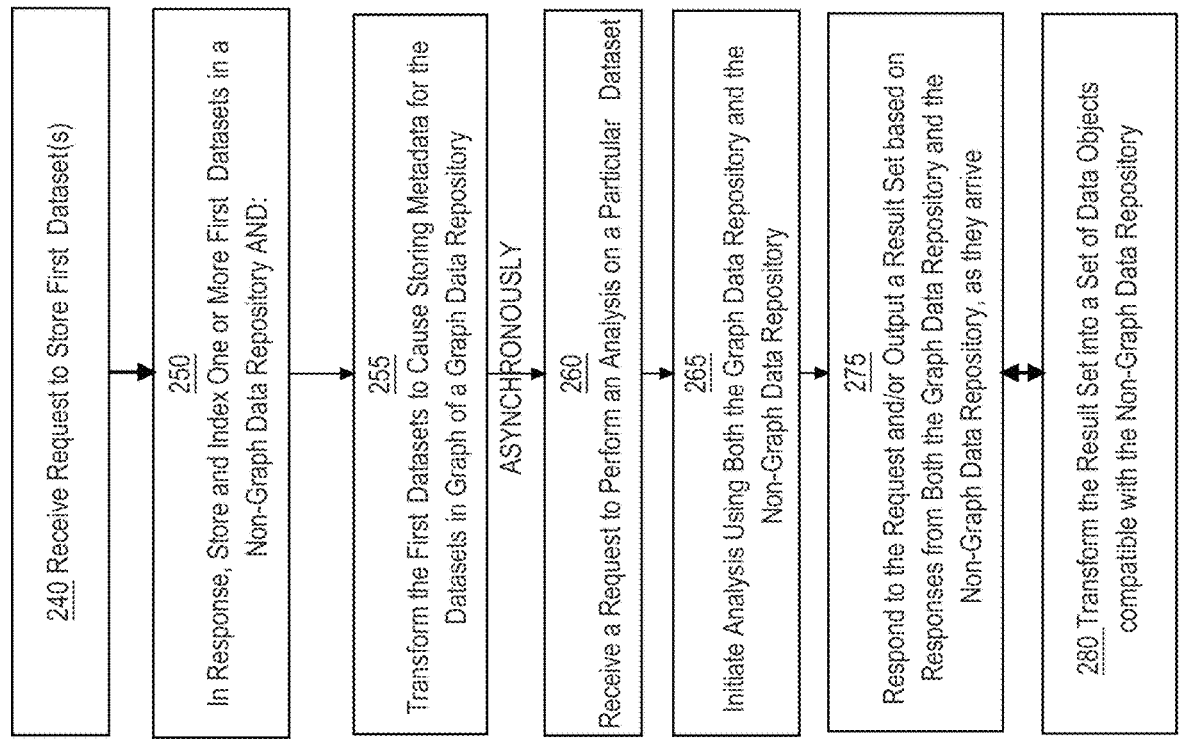

FIG. 2 depicts an example method for selecting a backing store for responding to a request to perform an analysis on a particular dataset based on an attribute of the request.

FIG. 2 is described with reference to FIG. 1, for purposes of illustrating a clear example, but other embodiments may use a functionally equivalent algorithm in other contexts or with other data processing systems not specifically the same as FIG. 1. Further, each of FIG. 2, FIG. 3 and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

At step 240, a request to store one or more first datasets is received. As an example, step 240 may comprise the query control instructions 116 (FIG. 1) receiving a programmatic call specifying that a particular dataset is to be stored. The call can come from the application instance 132 or another application, program, computer or system. "Call," in this context, may refer to any form of electronic messaging that computers can transmit, receive or exchange and may include an alert, notification, poll, request, remote procedure call or other invocation. The specific mechanism used for the call is not critical and what is important is that the query control instructions 116 receive data specifying that a particular dataset is to be stored.

In one embodiment, the request at step 240 is to store one or more first datasets that conform to a schema or ontology that is supported only in the non-graph data repository 114. For example, a client computer may be executing an application that uses the non-graph data repository 114 as a native data store, where the user interface of the application or other substantive functions of the application depend on using the schema or ontology of the non-graph data repository.

At step 250, in response to step 240, the process stores and indexes the one or more first datasets in the non-graph repository, and also performs step 255. Step 250 may comprise, for example, the query control instructions 116 transmitting the specified dataset to the non-graph data repository 114 for storage in columnar data store 122 and for indexing in the index 123.

At step 255, the process also transforms the first dataset to cause storing metadata of the first dataset in a graph of a graph data repository. Step 255 may comprise, for example, providing metadata to the graph data repository 112 and calls or instructions to cause the graph data repository to store the metadata in data graphs 118 as electronically stored digital data representing nodes and edges or relationships based on the metadata. The transforming of step 255 may comprise changing the first dataset, or metadata derived from it, into output data that conforms to a schema of the graph data repository 112, where the schema of the graph data repository has been previously defined and is different from a separate schema or ontology of the non-graph data repository 114. For example, step 255 may comprise using mapping logic to transform properties or attributes of data objects that are represented in the dataset, using the native schema or ontology of the non-graph data repository 114, into nodes and edges that can be stored in data graphs 118.

In one embodiment, storing at step 255 includes creating and/or storing a node, in the graph data repository 112, for each version of each data object in the first dataset that conforms to the schema or ontology of the non-graph data repository 114. Storing 255 may also involve finding the correct existing node in the data graphs 118, and having a realm identifier that matches either the current realm or the base realm, and updating that node with edges, version nodes or property nodes based on the data object. Properties or attributes of each such data object may be mapped to property nodes in the data graphs 118 that have edges linking the property nodes to object version nodes.

Furthermore, embodiments of the query control instructions 116 may implement data access security techniques. In one approach, each node in data graphs 118 representing a version of a data object of the non-graph data repository 114 is linked to a secure component node (SCN) representing each secure component of the data object that is defined in the non-graph data repository. The security model of the non-graph data repository 114 may be mapped to the data graphs 118 using either of two approaches.

In one embodiment, rather than using an SCN, a node in data graphs 118 may have a secure component property that holds digital data representing the secure component. Each such SCN or secure component property may comprise a set of one or more access control list (ACL) identifiers that identify access control lists specifying security policies. In an embodiment, storing a node in the data graphs 118 comprises the query control instructions 116 calling an external security program, method or system and attempting to read a specified ACL identifier; if such a read operation results in a programmatic success response, then query control instructions add an SCN or secure component property having the specified ACL identifier. With this approach, the query control instructions 116 are programmed to rely on the external security program, method or system to validate and add security controls with the same security effect as already recorded in the non-graph data repository 114 for data objects that correspond to a particular node.

Alternatively, query control instructions 116 may be programmed to create separate nodes in the data graphs 118 to represent each ACL, along with group nodes that are linked to the ACLs, and user permission nodes and/or investigation permission nodes that are linked to one or more group nodes. The query control instructions 116 may be programmed to pass ACL identifiers to ACLs or to represent the ACLs directly in the data graphs 118. An example is further described herein in connection with FIG. 5.

In an embodiment, data source records associated with data objects of the non-graph data repository 114 are not stored in the graph data repository 112. Instead, the graph data repository 112 stores nodes representing data objects and metadata representing properties or attributes. The non-graph data repository 114 serves as a store of record for the data source records. As further described, when result sets are obtained in response to queries to the graph data repository 112, result nodes may be mapped back to data objects of the non-graph data repository, and data source records may be obtained thereafter.

The foregoing approach may help reduce the computing resources needed to execute the graph data repository 112. However, in other embodiments in which larger amounts of computing resources are possible, then storing data source records in the graph data repository 112 could be performed. These trade-offs are considered an implementation detail that can be addressed when an embodiment is deployed.

In an embodiment, nodes in the graph data repository 112 further comprise one or more realm identifiers that identify logical realms to which the nodes, and the related data objects of the non-graph data repository 114, belong. A "realm," in this context, is a complete view of all data objects associated with an investigation and that have been defined in a particular data repository; thus, a data object may have a realm identifier indicating an investigative context and a source realm identifier indicating a data repository. Attaching realm identifiers to nodes in the graph data repository 112 enables query control instructions 116 to call existing realm management programs, methods or systems to determine whether particular nodes are visible to a particular account, analyst or investigator who is using a client computer interacting with the system.

Alternatively, realms can be represented using realm nodes in the data graphs 118 with edges to nodes that are within those realms.

Steps 260, 265, 275 may be performed asynchronously with respect to the preceding steps, meaning that they can occur any time after steps 240, 250, 255 and can be performed repetitively any number of times as appropriate for data analysis that users or client computers require. At step 260, the process receives a request to perform an analysis on a particular dataset. For example, step 260 may comprise receiving a data search query that specifies a named dataset, or receiving a search query when a dataset or data repository already has been specified.

In one embodiment, a query requests the shortest path between two specified nodes, and concurrently specifies a realm identifier; if the realm identifier is omitted, then the query control instructions 116 may be programmed to find and read a realm identifier of a current realm. Such a query requests the system to return a path showing all nodes of the graph data repository 112 corresponding to visible versions of data objects of the non-graph data repository 114, and within either in the current realm or a base realm upon which the current realm is based. Furthermore, query control instructions 116 are programmed to determine that each node in the path is a valid secure component or a valid data object version, again with a realm identifier in the current realm or base realm, so that results show only nodes corresponding to the most recent visible versions of the data objects. Query control instructions 116 also are programmed to determine that the current user account has permission to read the associated ACL and view or use the associated secure component. Property values of property nodes linked to an object version node are inspected to determine if a node has a link; if so, a first edge to a link node is followed and a second edge from that link node to another linked object version node is followed. The foregoing corresponds to walking an edge between two nodes, and is repeated iteratively and recursively until all nodes with links have been traversed and checked. Filtering operations are implemented to drop nodes from a result set when any of these checks fails. The result is a set of nodes on a path between a starting node and an ending node that the current user or investigation is permitted to view in a result set, either using a graphical view, a tabular view or other view.

At step 265, the process initiates analysis using both the graph data repository and the non-graph data repository. For example, step 265 may comprise programmatically submitting the query to both the graph data repository 112 and the non-graph data repository 114, using application programming interfaces, remote procedure calls or any other suitable programmatic call mechanism. Submitting a query may use a native Java API of the graph data repository system, for example, or any other query submission mechanism that the graph repository system supports.

Step 265 also may involve performing query translation. For example, the query received at step 265 could be expressed using a query syntax that is compatible with a search interface or query language of the non-graph data repository 114, but not compatible with similar interfaces or languages of the graph data repository 112. As a specific example, a query could be received in SQL, but the query language of graph data repository 112 could be CYPHER when that repository is implemented using NEO4J. Therefore, machine translation may be performed to transform a SQL request received at step 260 into a CYPHER query that can be processed directly using the graph data repository 112.

At step 275, the process responds to the request of step 260, and/or outputs a result set, based on responses that are received from both the graph data repository and the non-graph data repository, as they arrive. For example, step 275 may comprise first receiving a result set 218 from the graph data repository 112 and displaying that result set, then receiving a second, different result set 222 from the non-graph data repository 114 and displaying the second, different result set. In so doing, the query control instructions 116 are programmed to perform all of the tests or checks of visibility, versions and security that have been previously described, by calling one or more other programs, methods or systems to check each node of the result set, via data objects in the non-graph data repository that correspond to the nodes.

In an embodiment, at step 280, the result set obtained from the graph data repository is transformed into a set of data objects that are compatible with the non-graph data repository. For example, mapping logic may be used at step 275 to transform the first result set from the graph data repository 112 into a schema or ontology that is compatible with non-graph repository 114. As with the converse operation discussed with step 255, step 280 can comprise using mapping logic to transform nodes and edges of data received in the first result set into data objects and properties or attributes of data objects that are represented in the schema or ontology of the non-graph data repository 114, including properties representing references or links to other data objects. The resulting data objects then can be passed to a program, function or method that is capable of rendering a graphical user interface display of the data objects.

Further, in some embodiments, step 275 or step 280 may comprise joining the first result set 218 with the second, different result set 222 that was received from the non-graph repository to form the final result set 220. For example, the first result set from the graph data repository 112 may be transformed, updated, modified or supplemented with the second, different result set to create a final result set 220, which is then used in display functions or to transmit to another system, program or process.

With this approach, the techniques described herein can be seamlessly integrated into a data analysis environment that is already fully developed for operation just with the non-graph data repository 114 and its native schema or ontology. Methods, functions or tools that have been developed for that environment do not need to be rewritten, as the query control instructions 116 may be programmed to perform two-way mapping of one schema or ontology to another.

In some embodiments, when a first result set 218 from the graph data repository 112 has been received, any incomplete open transaction with the non-graph data repository 114 may be terminated, preventing the formation of the second result set 222, and only the first result set is displayed. Such an approach may optimize the display of data based upon differing response times of the data repositories 112, 114.

In various embodiments, step 275 may involve directly displaying result set data 218, 220, 222, causing display through programmatic means such as a program call or returning data to a calling process or program, transmitting the result set to another system and so forth.

Figure 3:
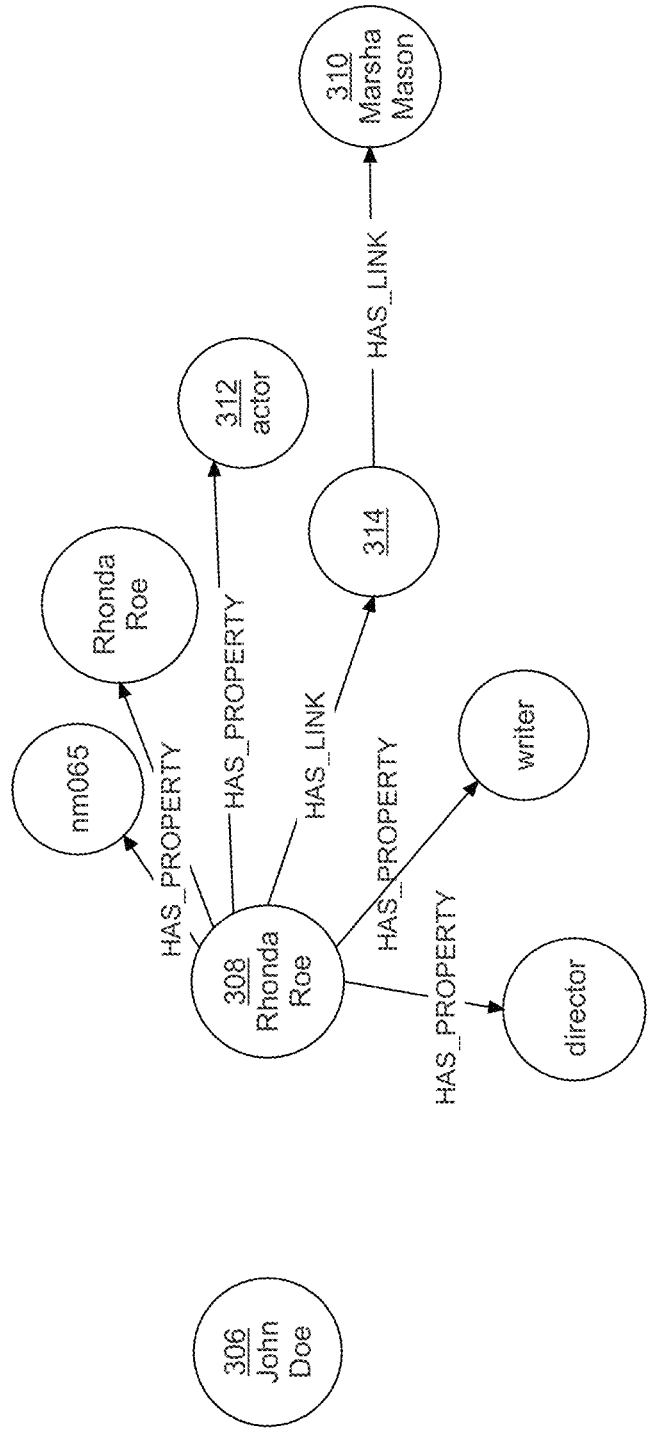
FIG. 3 illustrates an example graphical user interface that may be generated by the query control instructions and/or the graph data repository.

FIG. 3 illustrates an example graphical user interface that may be generated by the query control instructions and/or the graph data repository.

In an embodiment, a graphical user interface window 300 is generated under program control using a computer display device and includes a query editor panel 302, a query panel 320 and a graph display panel 304. In an embodiment, the query editor panel 302 displays one or more lines of a query that a user computer is authoring or editing. In the example of FIG. 3, five (5) lines of query language text are shown to express a complex query.

In an embodiment, the query panel 320 displays a query that was actually executed against the graph data repository 112, and the graph display panel 304 displays visible geometric shapes, icons or symbols representing nodes, connected by labeled arrows representing relationships.

In the example of FIG. 3, graph display panel 304 includes a first node 306, second node 308, a plurality of properties 312 that are linked to the second node 308, a linking node 314, and a third node 310 that is linked to the second node via the linking node and two links between them. In the example, graph display panel 304 illustrates output, displayed in the form of a visual graph consisting of nodes and links, resulting from execution of the query of query panel 320.

In some embodiments, a view like FIG. 3 may be used for inspecting the contents of the data graphs 118 in the graph data repository 112 (FIG. 1) after step 255 (FIG. 2) has caused storing nodes and relationships in the graph data repository based upon data objects of the non-graph data repository 114. Or, query control instructions 116 may be programmed to generate displays like FIG. 3 as part of an online query processing system in which queries can be typed and edited in one GUI panel and output from running queries against the graph data repository 112 may be viewed in another GUI panel that is concurrently displayed with the first panel.

The foregoing disclosure has focused upon queries that seek a shortest path between two nodes. For example, a shortest path could represent the fewest relationships between two nodes that represent persons, events, places or other entities in an investigation. However, embodiments also may be implemented for other applications or functions. For example, path search queries may be merely one type of search around function that is implemented in a larger data analysis system. A search around is one of the best ways to contextually expose data related to a set of selected objects. In one embodiment, search around types that can be performed include:

Event—Searches to 2 degrees of separation, exposes all events linked to selected objects (1 degree) and all entities that are linked to selected objects through an event intermediary (2 degrees).

Linked Entities—Searches to 1 degree of separation, exposes all entities that are linked to selected objects.

Linked Document—Searches to 1 degree of separation, exposes all documents which are linked to an entity, these may be documents where the entity is tagged within them.

Properties—Searches to 1 degree of separation, exposes all objects that contain a property and value which have a matching property and value to one of the searchable properties on the selected objects; setting of properties as searchable is done in the ontology. This means that, for instance, if name is a searchable property and we search around John Doe by properties then his parents, children and wife could be exposed as they all have matching surnames. The ontology is crafted to include properties suitable for search.

Paths—Searches to 2 degrees of separation, exposes the paths that exist between two selected objects. For example, John Doe to Richard Roe would be exposed by virtue of John Doe being linked to Pat's Coffee Shop and Pat's Coffee Shop linked to Richard Roe.

To implement these search around types, in part, query control instructions 116 are programmed to follow only certain links as appropriate for the type of the search around, and to include a particular node in search results only if it has certain property values that are appropriate based on the type of search around. While other examples in this disclosure are shown just for the path search type of search around, searches of the types Event, Linked Entities, Linked Document, and Properties also could be implemented using different structure for queries.

In some embodiments, a query could result in no match in the graph(s) in data graphs 118. Certain graph data repositories 112 may be programmed by default to perform an exhaustive search of the data graphs 118 by default, in response to detecting no match initially. When exhaustive fallback search is an option in the graph data repository 112, that option may be suppressed by configuration data or other programming.

Figure 4:
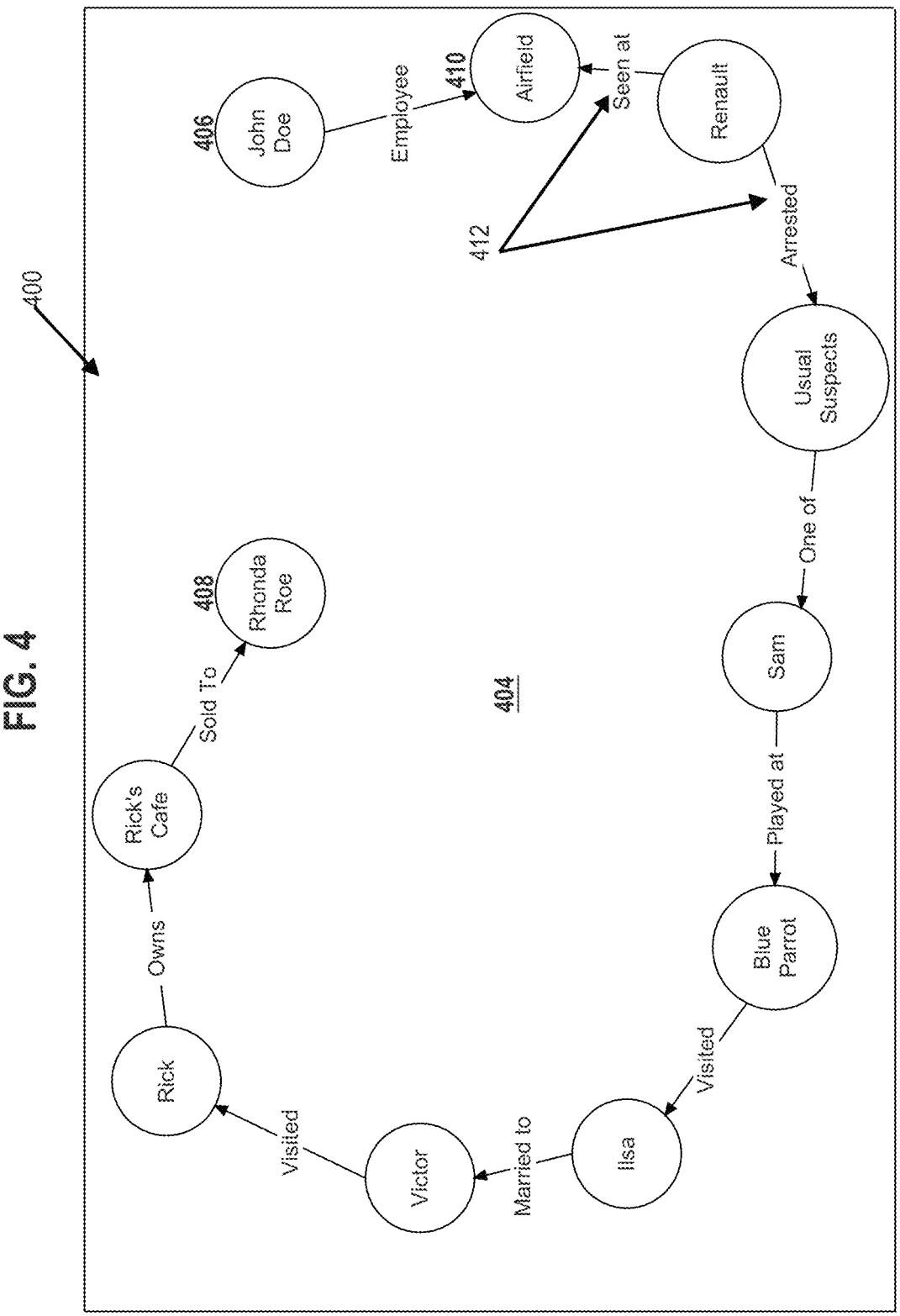
FIG. 4 illustrates an example graphical user interface that may be generated as a result of executing the process of FIG. 2.

FIG. 4 illustrates an example graphical user interface that may be generated as a result of executing the process of FIG. 2.

In the example of FIG. 4, a graphical user interface window 400 displays a visual graph 404 that visually illustrates a plurality of nodes 406, 408, 410 connected by links 412. In some embodiments, completing execution of step 275 (FIG. 2) may result in displayed the GUI window 400 of FIG. 4. Nodes 406, 408, 410 may be visually represented using different graphical icons that match a type of a node such as person, place, event or other types. Links 412 may include text labels and may be displayed with or without arrowheads.

The example of FIG. 4 shows output from a sixth-degree path type search-around directed to finding a path from a first node 406 to a second node 408 with a maximum of six intervening nodes of type Person. There may be other nodes and links to those nodes in the path. Output of FIG. 4 is obtained only from graph data repository 112 in this example. In an embodiment, each of the nodes 406, 408, 410 is associated with a selectable hyperlink which, when selected, causes displaying data obtained from data objects of the non-graph data repository 114 that have been mapped to the nodes 406, 408, 410. Furthermore, in some embodiments, permission data may be inspected by selecting a permissions browsing panel to update ACLs, group membership or other aspects of security control. The query control logic 116 may be programmed to generate such a browsing panel as a mechanism for user interaction with a graph-based data security model of the type discussed next for FIG. 5.

Figure 5:
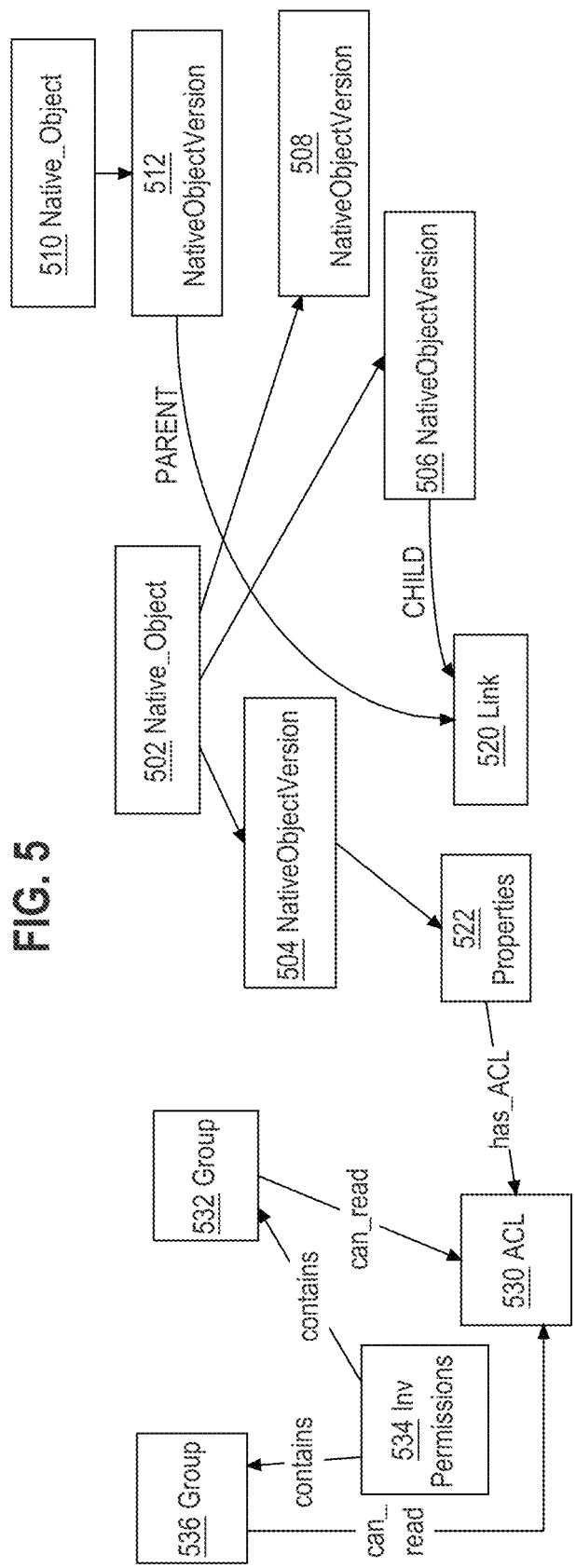
FIG. 5 illustrates an example of data objects of a non-graph database that have been mapped into nodes and edges for digital data representation in a graph database.

FIG. 5 illustrates an example of data objects of a non-graph database that have been mapped into nodes and edges for digital data representation in a graph database.

In the example of FIG. 5, Native_Object 502 represents some data object of the native schema or ontology of the non-graph database 114 that has been mapped into and is represented by a node in the graph database 112, as in data graphs 118. Native_Object 502 is linked to a plurality of different versions 504, 506, 508. Similarly, a second, different Native_Object 510 has a version 512. Native object versions 506, 512 may have time attributes that specify times at which those versions were valid. Native object versions 512, 506 are related as parent and child objects respectively, as indicated by edges (represented as arrows in FIG. 5) connecting them to a link object 520. Furthermore, in one embodiment, each native object version is linked to a properties node that contains and represents properties of the object; properties node 522 is shown, as an example, for native object version 504.

Security in the form of ACLs and groups may be linked to the properties node 522 as illustrated by ACL node 530. Each ACL node is linked to at least one Group node, for example, node 532 or node 536. Typically, a group consists of a plurality of investigations that are managed together; an example investigation node 534 is shown linked to the group node 536 and represents investigation permissions. In other embodiments, access control items other than groups may be represented using other types of nodes. Further, user permissions may be represented as node 534 rather than investigation permissions. Group nodes 532, 536 may have identifier value Group_ID as a property. Native objects, native object versions, and investigations may have realm identifiers as properties.

In an embodiment, query control logic 116 is programmed to map or transform each data object that is the subject of a data storage request, and that conforms to a schema or ontology of the non-graph database 114, into a set of nodes and edges in the general format illustrated in FIG. 5. Furthermore, query control logic 116 is programmed to reflect the security model implemented in the non-graph database 114 for such a data object in the data graphs 118 by mapping ACLs, groups and investigations into nodes and edges representing security elements and relationships, also as seen in FIG. 5.

Additionally, performing search queries against the graph data repository 112 involves walking the edges shown in FIG. 5, as an example, to resolve whether a secure component has properties that include an ACL; if so, what groups can read or write that ACL; and which investigations or users are associated with groups. Visible links are traversed and edge filtering is performed on edges that lead to relevant properties, resulting in creating output paths that are valid for purposes of displaying in the form seen in FIG. 4. By programming query control 116 to walk these edges and determine the contents of nodes and edges, a response to a query can include only those secure components, such as native object versions, that a particular user or investigation is permitted to view as specified in the ACLs, group and investigation nodes and their relationships.

As noted above, in some embodiments, permission data captured in the ACL, group, group ID and investigation nodes of FIG. 5 may be inspected by selecting a permissions browsing panel to update ACLs, group membership or other aspects of security control. The query control logic 116 may be programmed to generate such a browsing panel as a mechanism for user interaction with a graph-based data security model of the type shown in FIG. 5. The browsing panel may present data derived from nodes of FIG. 5, as then currently stored in memory or in the data graphs 118, in a hierarchical manner or a graphical manner.

With the techniques illustrated herein, path search optimizations that are inherently part of graph databases may be integrated into a larger data analysis system without disruptive effect on other, established aspects of the system. Data storage requests may result in concurrent storage of metadata in a graph database, as well as complete data objects in a non-graph database. Queries may be translated into a format compatible with the graph database and concurrently submitted to both the graph database and a non-graph database. For path searches and other types of search-around operations, submitting queries to the graph database yields far faster results especially when metadata derived from data objects that are native to the non-graph database, rather than data objects with source data records, is managed in the graph database.

A security model implemented in the non-graph database, and supported by permissions checking systems, ACL validation systems and realm or visibility management logic, may be integrated into the graph database by using graph nodes and relationships to represent security context. Therefore, the hybrid approach of this disclosure enables executing fast, path-oriented searches without modifying a data store of record and without rewriting all the security support systems for that data store. Furthermore, there is no requirement to traverse indexes of a relational database or other non-graph data repository in an attempt to support path-based searching.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
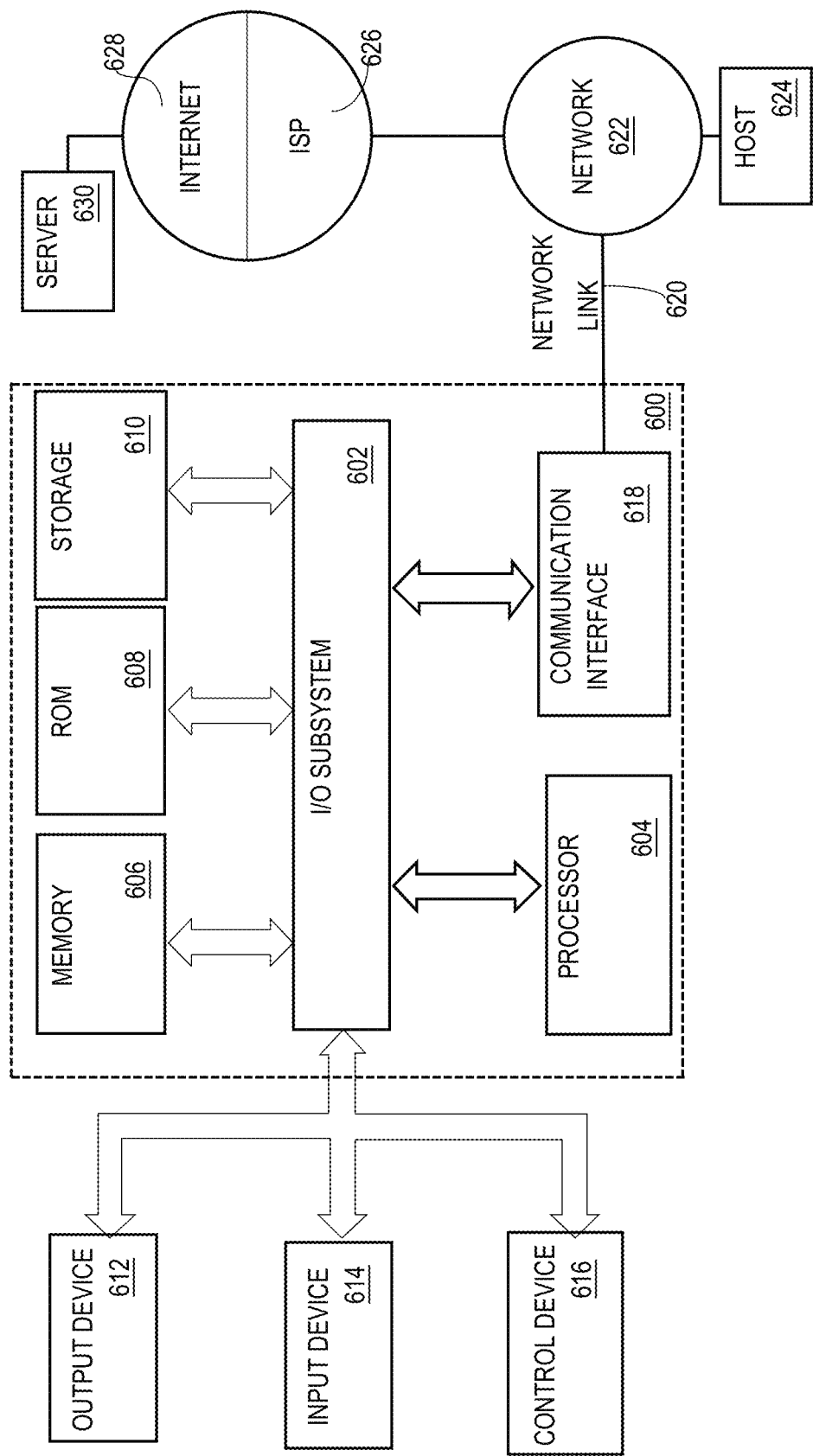
FIG. 6 is a block diagram that illustrates a computer system upon which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Implementation Example—Basic Software System

Figure 7:
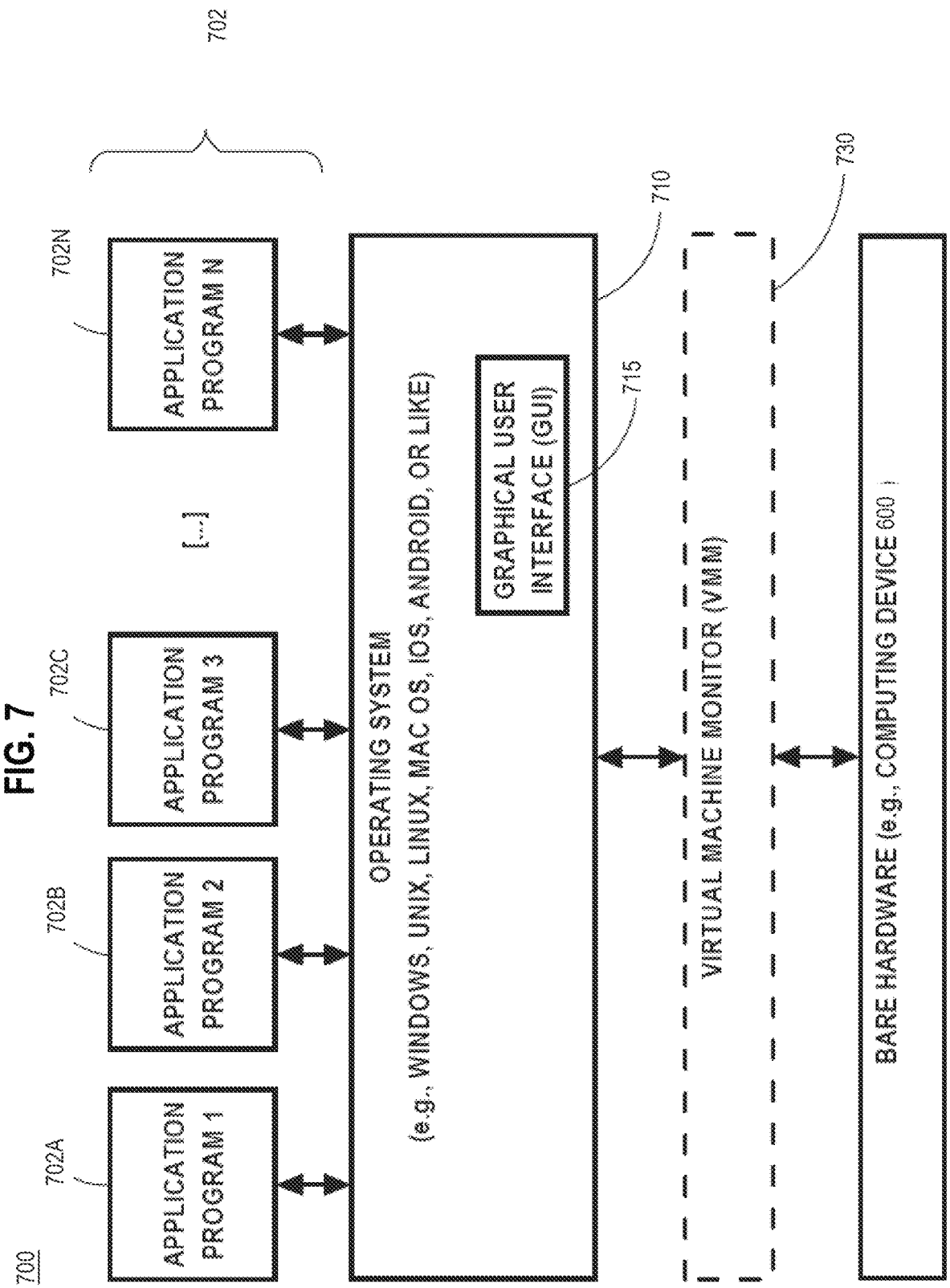
FIG. 7 is a block diagram of a basic software system that may be employed for controlling the operation of a computing device.

FIG. 7 is a block diagram of a basic software system 700 that may be employed for controlling the operation of computing device 400. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 400. Software system 700, which may be stored in system memory (RAM) 406 and on fixed storage (e.g., hard disk or flash memory) 410, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 410 into memory 406) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 404) of device 400. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 400.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 400 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented data processing method comprising:
receiving a request to store a digital data object in a non-graph data repository, the data object comprising one or more first properties, the data object conforming to a first schema of the non-graph data repository;
in response to the receiving:
digitally storing the data object in the non-graph data repository;
transforming the data object into one or more nodes and edges of a graph, comprising transforming the one or more first properties into one or more property nodes in a graph data repository linked by edges to an object node and at least one object version node in the graph data repository;
storing the one or more nodes and edges of the graph in a graph data repository that is separate from the non-graph data repository;
electronically receiving a search query that specifies a search based on a path of connections between endpoint entities;
in response to receiving the search query:
transforming the search query into a graph search query;
submitting the graph search query to the graph data repository;
receiving a result set of nodes from the graph data repository;
transforming the result set of nodes into a set of corresponding data objects in the non-graph data repository;
providing the set of corresponding data objects as output in a computer display;
wherein the method is performed using one or more digital electronic computers.

2. The method of claim 1, wherein the search query is in a first computer-readable search query language; wherein the transforming the search query into a graph search query further comprises automatically transforming the search query into a second computer-readable search query language that is compatible with the graph data repository and is different than the first computer-readable search query language.

3. The method of claim 1, further comprising transforming the data object into one or more nodes and edges of a graph, by transforming a reference in a first data object, which links the first data object to a second data object in the non-graph data repository, into a link node in the graph data repository having a first edge that is connected to a first node representing the first data object and having a second edge that is connected to a second node representing the second data object, in the graph data repository.

4. The method of claim 1 further comprising transforming the data object into one or more nodes and edges of a graph by transforming one or more access control list objects, group identifiers and group objects of the non-graph data repository into one or more ACL nodes having edges linked to group identifier nodes, and group nodes in the graph data repository.

5. The method of claim 1, further comprising:
concurrent to the submitting the graph search query to the graph data repository, submitting the search query to the non-graph data repository;
receiving, from the non-graph data repository, a second result set of data objects;
merging the second result set of data objects into the set of corresponding data objects based on the result set of nodes, to form a combined search result set of data objects;
providing the combined search result set of data objects as output in the computer display.

6. The method of claim 4, further comprising submitting the search query as a primary search to the non-graph data repository, submitting the graph search query as a secondary search to the graph data repository while the primary search is executing, and providing, as output in the computer display, first or second result sets from either the non-graph data repository or the graph data repository in an order of receiving the first or second result sets.

7. The method of claim 1, further comprising causing displaying providing the set of corresponding data objects as output in the computer display by graphically displaying a line representing a path between the corresponding data objects, and graphically displaying a plurality of graphical icons spaced apart along the line and representing the corresponding data objects.

8. The method of claim 1, wherein transforming the result set of nodes into a set of corresponding data objects in the non-graph data repository comprises automatically mapping each node in the result set of nodes into one or more data objects in the first schema of the non-graph data repository.

9. The method of claim 7, further comprising transforming a property node, which is linked to a particular node in the result set of nodes, by updating individual property values of the property node into individual corresponding property attribute values of the one or more data objects.

10. A computer system comprising:
one or more hardware processors;
one or more non-transitory data storage media coupled to the one or more hardware processors and storing one or more sequences of instructions which, when executed by the one or more hardware processors, cause the one or more hardware processors to perform:
receiving a request to store a digital data object in a non-graph data repository, the data object comprising one or more first properties, the data object conforming to a first schema of the non-graph data repository;
in response to the receiving:
digitally storing the data object in the non-graph data repository;
transforming the data object into one or more nodes and edges of a graph, comprising transforming the one or more first properties into one or more property nodes in a graph data repository linked by edges to an object node and at least one object version node in the graph data repository;

storing the one or more nodes and edges of the graph in a graph data repository that is separate from the non-graph data repository;

electronically receiving a search query that specifies a search based on a path of connections between endpoint entities;

in response to receiving the search query:
transforming the search query into a graph search query;
submitting the graph search query to the graph data repository;
receiving a result set of nodes from the graph data repository;
transforming the result set of nodes into a set of corresponding data objects in the non-graph data repository;
providing the set of corresponding data objects as output in a computer display.

11. The computer system of claim 10, wherein the search query is in a first computer-readable search query language; wherein the instructions which when executed cause transforming the search query into a graph search query further comprise instructions which when executed cause automatically transforming the search query into a second computer-readable search query language that is compatible with the graph data repository and is different than the first computer-readable search query language.

12. The computer system of claim 10, the non-transitory data storage media further comprising instructions which when executed cause transforming the data object into one or more nodes and edges of a graph, by transforming a reference in a first data object, which links the first data object to a second data object in the non-graph data repository, into a link node in the graph data repository having a first edge that is connected to a first node representing the first data object and having a second edge that is connected to a second node representing the second data object, in the graph data repository.

13. The computer system of claim 10 the non-transitory data storage media further comprising instructions which when executed cause transforming the data object into one or more nodes and edges of a graph by transforming one or more access control list objects, group identifiers and group objects of the non-graph data repository into one or more ACL nodes having edges linked to group identifier nodes, and group nodes in the graph data repository.

14. The computer system of claim 10, the non-transitory data storage media further comprising:
instructions which when executed cause, concurrent to the submitting the graph search query to the graph data repository, submitting the search query to the non-graph data repository;
instructions which when executed cause receiving, from the non-graph data repository, a second result set of data objects;
instructions which when executed cause merging the second result set of data objects into the set of corresponding data objects based on the result set of nodes, to form a combined search result set of data objects;
instructions which when executed cause providing the combined search result set of data objects as output in the computer display.

15. The computer system of claim 13, the non-transitory data storage media further comprising instructions which when executed cause submitting the search query as a primary search to the non-graph data repository, submitting the graph search query as a secondary search to the graph data repository while the primary search is executing, and providing, as output in the computer display, first or second result sets from either the non-graph data repository or the graph data repository in an order of receiving the first or second result sets.

16. The computer system of claim 10, the non-transitory data storage media further comprising instructions which when executed cause causing displaying providing the set of corresponding data objects as output in the computer display by graphically displaying a line representing a path between the corresponding data objects, and graphically displaying a plurality of graphical icons spaced apart along the line and representing the corresponding data objects.

17. The computer system of claim 10, wherein the instructions which when executed cause transforming the result set of nodes into a set of corresponding data objects in the non-graph data repository comprise instructions which when executed cause automatically mapping each node in the result set of nodes into one or more data objects in the first schema of the non-graph data repository.

18. The computer system of claim 16, the non-transitory data storage media further comprising instructions which when executed cause transforming a property node, which is linked to a particular node in the result set of nodes, by updating individual property values of the property node into individual corresponding property attribute values of the one or more data objects.

* * * * *